Aug. 22, 1933.  R. K. WINNING  1,923,348
SHAVING AND SLICING MECHANISM
Filed Feb. 28, 1931
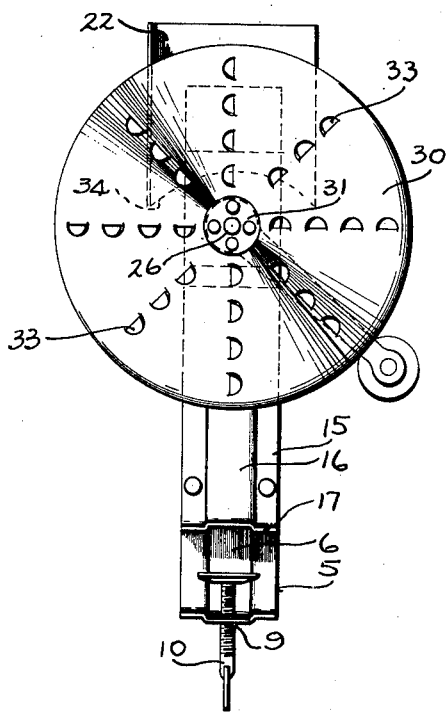
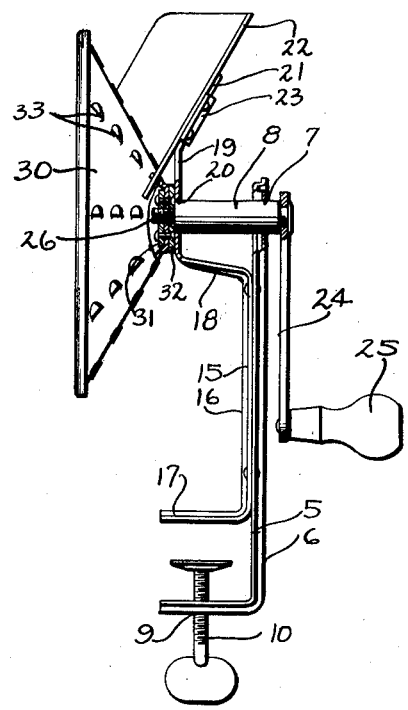
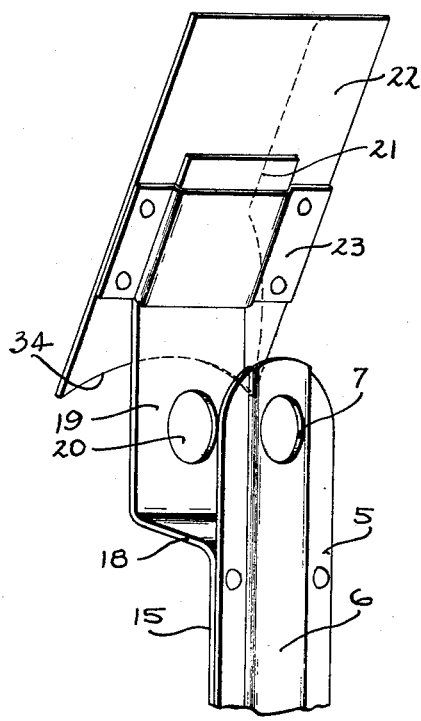
INVENTOR
*Robert K. Winning*
BY
*Wheeler, Wheeler & Wheeler*
ATTORNEYS Patented Aug. 22, 1933

1,923,348

UNITED STATES PATENT OFFICE 1,923,348

SHAVING AND SLICING MECHANISM

Robert K. Winning, Wauwatosa, Wis., assignor to Clum Manufacturing Company, Milwaukee, Wis., a Corporation of Wisconsin Application February 28, 1931. Serial No. 519,121

6 Claims. (Cl. 146—114)

This invention relates to improvements in shaving and slicing mechanism.

It is the primary object of the invention to provide in inexpensive and convenient form, a universally adaptable device for shaving, slicing and cutting any desired materials such as vegetables or soap, or the like.

More particularly stated, it is my object to provide a mechanism wherein the supporting bracket is of novel form for inexpensive manufacture and effective use, and the cutting or abrading wheel and hopper are respectively demountable so that they may be interchanged with other wheels or hoppers for different purposes.

In the drawing:

Figure 1 is a front elevation of a device embodying the invention.

Figure 2 is a side elevation of said device with a fragment of the rotor broken away to expose its connection to the shaft.

Figure 3 is an enlarged rear quarter detail in perspective, of the upper end of the bracket and its connection with the hopper.

Like parts are identified by the same reference characters throughout the several views.

The bracket has but two component parts, each of which is adapted for production by stamping or forming operations. The exterior part 5 comprises an L-shaped piece having a shallow channel or broad rib at 6 for stiffening. The longer arm is apertured at 7 to receive the rear end of shaft 8, and the shorter arm is apertured and tapped at 9 to receive the clamp screw 10.

The complementary member 15 of the bracket has a lower end portion which is likewise L-shaped, and which has a shallow channel or wide rib 16 similar to that shown at 6 but projecting in an opposite direction for further increasing the rigidity of the bracket. The longer arm of this part of member 15 is riveted to the longer arm of bracket member 5, and the shorter arm 17 of bracket member 15 is spaced above the clamp screw 10 for complementary co-operation therewith.

Above the longer arm of the portion of member 15 just described, said member is offset at 18 away from bracket member 5 and thence extends upwardly at 19, and is provided at 20 with a bearing opening for the forward end of shaft 8. The upper end of bracket member 15 comprises an arm 21 for the support of the hopper 22 which has a strap 23 detachably engageable with arm 21.

The short length of shafting at 8 has a crank arm 24 riveted to its rear end and provided with a handle or crank 25. At its forward end shaft 8 is reduced in diameter and threaded as shown at 26 to detachably receive the rotor or cutting wheel 30 which is of conical form and has its apex portion reinforced by disks 31 and 32 riveted to the inner and outer surfaces of the wheel and providing an adequate means of engaging the threaded portion 26 of shaft 8.

The form of the cutting, shaving, or grating knives or teeth carried by the rotor or wheel 30 is immaterial, a wide variety of such knives or teeth being known to the art. Preferably, the knives or teeth are formed integrally by partially severing and displacing integral portions of the conical disk 30 as shown at 33.

The hopper 22 is symmetrically disposed with reference to the shaft 8, and its lower margin is arcuately cut at 34 to conform fairly closely to the arcuate line of intersection of cone 30 by the plane of the back wall of the hopper.

While any desired type of hopper may be used, it is obviously unnecessary to have more walls than are illustrated, this being particularly true in view of the fact that the cone extends upwardly almost as far as the top of the hopper and thus, in effect, comprises a movable front wall therefor.

The device as illustrated is set up for cutting soap into fine shavings, but the apparatus is adapted for a multiplicity of other purposes for which it may be converted when necessary by the substitution of other hoppers on arm 21, and the substitution of other cutting, shaving, or abrading rotors upon the screw threaded portion 26 of shaft 8, or by either of these changes separately, as may be required.

I claim:

1. A cutting device of the character described including, a bracket comprising complementary members having L-shaped portions of which intermediate portions of the longer arms are fastened together and the shorter arms are in spaced relation, the upper ends of said longer arms being apertured and spaced apart to provide bearings for a shaft, and the shorter arm of the outer member being provided with a threaded aperture adapted to receive a clamping screw, one of said members having an arm extending above said bearing apertures for the support of a hopper, together with a clamp in said threaded aperture, a shaft in said bearing apertures, a rotary cutter carried by the shaft, and a hopper detachably carried by said upwardly projecting arm, said cutter inclined upwardly in front of said hopper and coacting therewith for retaining the material to be acted on.

2. In a cutting device the combination of a clamp comprising a pair of substantially L-shaped members fixed together to provide upper and lower horizontal portions, a screw engaged with one of said portions and cooperating with the other portion to form a gripping device, an offset portion extending from one of said members and having a bearing aperture therein, the other member having a bearing aperture in alignment with the first, a shaft journalled in said apertures, driving means fixed with said shaft, a threaded extension on said shaft, a conical cutting element removably threaded on said extension, a portion of one of said L-shaped members extending upwardly above the aperture therein, and a hopper removably supported on said portion.

3. A device of the class described including a supporting bracket, an operating shaft revolubly mounted in said bracket, a substantially cone-shaped rotor connected to one end of the shaft and extending from its apex outwardly from said end, a hopper having rear and side walls, and means on the rear wall connecting the hopper to said bracket, said rear wall diverging from its lower end inwardly and upwardly toward said bracket, said rotor extending upwardly and outwardly in front of said rear wall to constitute the front wall of the hopper and coacting with said rear wall for retaining the material to be acted on by the rotor.

4. A cutter of the class described including a bracket comprising a pair of members fastened together intermediate their ends and spaced apart adjacent their ends, the corresponding upper portions of said members having aligned openings, a substantially cone-shaped rotor having its shaft extending through said openings, and a hopper connected to one of said members, said rotor extending upwardly in front of said hopper and forming the front wall thereof, said members having corresponding lower portions bent at right angles to comprise clamp elements for connecting the bracket to a support.

5. In a cutter of the class described, a bracket comprising a pair of members fastened together intermediate their ends, and spaced apart adjacent their ends, corresponding upper portions of said members having aligned openings, a substantially cone-shaped rotor having its shaft extending through said openings, the corresponding lower portions of said members being bent at right angles to comprise elements of a clamp, said members being channeled and arranged with their channels projecting in opposite directions, and a hopper slidably connected to one of said members, said rotor extending upwardly in front of said hopper and forming the front wall thereof so as to coact with the hopper to retain the material to be acted on by the rotor.

6. A cutter of the class described, including a bracket having complementary members provided with L-shaped portions, the intermediate portions of the longer arms of said members being fastened together and the shorter arms spaced relative to each other, the upper end of the longer arms being apertured and spaced apart, a substantially cone-shaped rotor having its shaft extending through the apertures, the shorter arm of the outer member being provided with an aperture adapted to receive a clamping screw, and a hopper slidable connected to the upper portion of one of said members, said rotor extending upwardly in front of said hopper and forming the front wall thereof so as to coact with the hopper for retaining the material to be acted on by the rotor.

ROBERT K. WINNING.